United States Patent
Colson et al.

(10) Patent No.: US 11,292,241 B2
(45) Date of Patent: Apr. 5, 2022

(54) 3-D PACKAGING AND SHIPPING BASED ON AGGREGATE DATA

(71) Applicants: Shay C. Colson, Bellingham, WA (US); David A. Divine, Spokane, WA (US); David S. Thompson, Spokane, WA (US)

(72) Inventors: Shay C. Colson, Bellingham, WA (US); David A. Divine, Spokane, WA (US); David S. Thompson, Spokane, WA (US)

(*) Notice: Subject to any disclaimer, the term of this patent is extended or adjusted under 35 U.S.C. 154(b) by 471 days.

(21) Appl. No.: 15/594,640

(22) Filed: May 14, 2017

(65) Prior Publication Data
US 2017/0341795 A1 Nov. 30, 2017

Related U.S. Application Data

(60) Provisional application No. 62/341,073, filed on May 25, 2016.

(51) Int. Cl.
| | |
|---|---|
| *B33Y 50/00* | (2015.01) |
| *B33Y 10/00* | (2015.01) |
| *B65B 57/00* | (2006.01) |
| *B65B 5/02* | (2006.01) |

(52) U.S. Cl.
CPC .............. *B33Y 10/00* (2014.12); *B33Y 50/00* (2014.12); *B65B 5/02* (2013.01); *B65B 57/00* (2013.01); *B65B 2210/04* (2013.01)

(58) Field of Classification Search
None
See application file for complete search history.

(56) References Cited

U.S. PATENT DOCUMENTS

| | | | |
|---|---|---|---|
| 8,239,169 B2 | 8/2012 | Gregory et al. | |
| 9,248,611 B2 | 2/2016 | Divine et al. | |
| 2002/0079601 A1 | 6/2002 | Russell et al. | |
| 2004/0117273 A1 | 6/2004 | Henderson | |
| 2005/0256776 A1 | 11/2005 | Bayoumi et al. | |
| 2015/0052024 A1* | 2/2015 | Apsley | G06Q 30/0619 705/26.81 |
| 2015/0052025 A1 | 2/2015 | Apsley et al. | |
| 2015/0096266 A1* | 4/2015 | Divine | A61J 1/03 53/452 |
| 2015/0145158 A1 | 5/2015 | Levine et al. | |
| 2015/0249043 A1 | 9/2015 | Elian et al. | |
| 2016/0098730 A1 | 4/2016 | Feeney | |
| 2016/0122043 A1 | 5/2016 | Divine et al. | |
| 2016/0152358 A1 | 6/2016 | Divine et al. | |
| 2016/0280403 A1 | 9/2016 | Colson et al. | |

(Continued)

OTHER PUBLICATIONS

A Machine Learning Approach for Product Matching and Categorization, Petar Ristoski et al., IOS Press, 2016, 17 pages.

(Continued)

*Primary Examiner* — Timothy Kennedy
*Assistant Examiner* — Asha A Thomas

(57) ABSTRACT

Items may be packaged for shipping or storage using additive manufacturing techniques, also known as three dimensional (3-D) printing. 3-D printed packaging systems of one or more entities may be transmitted to an aggregator and used for, among other things, optimizing shipping and fulfillment of packages.

20 Claims, 6 Drawing Sheets

(56) References Cited

U.S. PATENT DOCUMENTS

| | | |
|---|---|---|
| 2017/0046806 A1 | 2/2017 | Haldenby et al. |
| 2017/0253354 A1 | 9/2017 | Colson et al. |
| 2017/0253401 A1 | 9/2017 | Bouthillier |
| 2017/0257358 A1 | 9/2017 | Ebrahimi et al. |

OTHER PUBLICATIONS

SAP and UPS work to attract partners to join Distributed Manufacturing early adopter program, Printer and 3D Printing News, http://www.3ders.org/articles/20160922-sap-and-ups-work-to-attract-partners-to-join-distributed-manufacturing-early-adopter-program.html, Sep. 22, 2016, 8 pages.

3D Hubs, Wikipedia, https://en.wikipedia.org/wiki/3D_Hubs, accessed on Feb. 3, 2018, 2 pages.

3D Hub, Your go-to service for ordering custom parts online, https://www.3dhubs.com/how-to-3d-print, accessed on Feb. 3, 2018, 2 pages.

Thingiverse features "Get This Printed" button to allow users to order 3D prints directly via 3D Hubs, Printer and 3D Printing News, http://www.3ders.org/articles/20150421-thingiverse-features-get-this-printed-button-order-3d-prints-directly-via-3d-hubs.html, 8 pages.

Notification of Transmittal of the International Search Report and Written Opinion of the International Searching or Authority, dated Jan. 18, 2018, from PCT/US17/54643, 17 pages.

How 3D printing empowers packaging operations, By Lisa McTigue Pierce, Optimization (accessed at http://www.packagingdigest.com/optimization/how-3d-printing-empowers-packaging-operations141014), Oct. 15, 2014, 3 pages.

Packaging 3D Print—The Global Upheaval That's About to Occur, by John Hauer, 3DPrint.com (accessed at http://3dprint.com/80700/packaging-3d-print/), Jul. 12, 2015, 8 pages.

Adobe co-develops 3D printing software to improve structural designs, By Justin Rubio (accessed at http://www.theverge.com/users/Justin%20Rubio), Sep. 20, 2012, 3 pages.

Stava et al., Stress Relief: Improving Structural Strength of 3D Printable Objects, available at least as early as Oct. 1, 2013, 11 pages.

3D Printing, Opportunities In Packaging, Get3DSmart, by John Hauer, available at least as early as Aug. 6, 2016, 69 pages.

Port of Rotterdam Launches Blockchain Lab, BTCMANGAGER, by Joseph Young, Sep. 29, 2017, 6 pages.

Flexport's epic plan to build a freight empire with its $110M raise, TechCrunch, by Josh Constine, Oct. 6, 2017, 10 pages.

SenseAware, a FedEx innovation, accessible at http://www.senseaware.com/how-it-works/, available at least as early as Oct. 2, 2017, 5 pages.

FedEx Introduces SenseAware, the Next Generation Supply Chain Information Platform, accessible at http://about.van.fedex.com/newsroom/fedex-introduces-senseaware-the-next-generation-supply-chain-information-platform/, Nov. 17, 2009, 6 pages.

SenseAware is FedEx's IoT response to supply chain optimization, RCRWireless News, by Phillip Tracy, available at https://www.rcrwireless.com/20160929/big-data-analytics/fedex-iot-tag31, Sep. 29, 2016, 5 pages.

Digital Print Solutions for Smart Packaging, Xerox, available at https://www.xerox.com/en-us/digital-printing/packaging-solutions/smart?CMP=PPC-PSG&HBX_PK=Smart_Packaging&HBX_OU=50&ADGRP=Packaging_-_Digital_Smart_Packaging_, available at least as early as Oct. 3, 2017, 5 pages.

Getting Smart with Digitally Printed Packaging, Xerox, available at https://www.xerox.com/en-us/digital-printing/packaging-solutions, available at least as early as Oct. 3, 2017, 6 pages.

Finding Blockchain-Based Security Solutions for the 3D Printing Economy, Bitcoin Magazine, by Giulio Prisco, available at http://www.nasdaq.com/article/finding-blockchain-based-security-solutions-for-the-3d-printing-economy-cm828884. August 8, 2017, 3 pages.

Trusted Internet of Things and Smart Supply Chain Solutions, Chronicled, available at https://www.chronicled.com/, available at least as early as Aug. 9, 2017, 3 pages.

Blockchain and the future of retail, ETRetail.com, by Singaravelu Ekambaram and Lata Varghese, Aug. 22, 2017, 6 pages.

3D printed Smart Tags ensure 100% authenticity of collectible shoes, www.3ders.org, by Kira, Mar. 10, 2016, 12 pages.

Cubichain Stores Data of 3D Printed Aircraft Parts in Blockchain, 3D Printing, Aerospace 3D Printing, Business, By Joseph Young, Dec. 7, 2016, 9 pages.

Voodoo Manufacturing, Small-Batch Manufacturing With High-volume 3D Printing, Voodoo Manufacturing, Available at least as early as Sep. 10, 2017, 20 pages.

Pharma Giants Use Ethereum Network to Prevent Counterfeit Medicine, BTCMANAGER, by Joseph Young, Sep. 25, 2017, 4 pages.

C3IOT, AI & IoT Software Platform for Digital Transformation, available at https://c3iot.com/, available at least as early as Aug. 18, 2017, 5 pages.

Smart sensors improve packaging machinery performance, Packaging Digest—Automation, by Mark Langridge, Apr. 15, 2015, 6 pages.

Smart Contracts: 12 Use Cases for Business & Beyond, Prepared by: Smart Contracts Alliance—In collaboration with Deloitte, available at http://bloq.com/assets/smart-contracts-white-paper.pdf, Dec. 2016, 56 pages.

Technology Innovation Profile: 3D Printing and Going Local, FedEx Healthcare Solutions, http://www.fedex.com/us/healthcare/knowledge-center/technology/technology-innovation-profile-3d-printing-and-going-local.html, available at least as early as Oct. 6, 2017, 3 pages.

3D Printing will make manufacturing local, Epson Insights, Jun. 12, 2017, 5 pages.

The race to connect smart contracts to the real world, American Banker, By Brian Patrick Eha, Aug. 7, 2017, 8 pages.

\* cited by examiner

3-D PACKAGING AND SHIPPING BASED ON AGGREGATE DATA

This application claims the benefit of U.S. Provisional Application No. 62/341,073, filed May 25, 2016, which is incorporated herein by reference. This application is also related to U.S. patent application Ser. No. 14/146,725, filed Jan. 3, 2014, which claims the benefit of U.S. Provisional Application No. 61/887,973, filed Oct. 7, 2013, both of which are incorporated herein by reference.

BACKGROUND

Products are commonly packaged by a manufacturer or distributor prior to sale. This sort of packaging is referred to as "retail packaging." Retail packaging varies widely depending on the products to be packaged, the size and the weight of the products, the durability or fragility of the products, where and how the products are to be sold, and numerous other factors. The retail packaging for a particular product is often designed specifically for the particular product. Considerable time and expense goes into designing retail packaging for a product. Due to the specialized nature of retail packaging, the retail packaging for one product is not likely to be suitable for another product. Thus, the cost of designing retail packaging for a product significantly increases the cost of making the product available for sale. Such upfront design costs may make retail packaging of some low volume or limited run products cost prohibitive.

Products and other items (collectively referred to as "items") may subsequently be packaged for storage and/or shipping. This sort of packaging is referred to as "non-retail packaging." Non-retail packaging typically employs general-purpose packaging supplies, such as cardboard boxes, bubble wrap, polystyrene peanuts, tissue paper, shrinkwrap, packing tape, and the like. Such general-purpose packaging supplies are readily available, but are not particularly suited for the specific items to be packaged. Consequently, items may be damaged during storage and/or transportation. Furthermore, the effectiveness of packaging is dependent largely on how the user chooses to package the item. Many users lack the skills or experience to effectively package items.

Accordingly, there remains a need for improved methods of retail and non-retail packaging.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
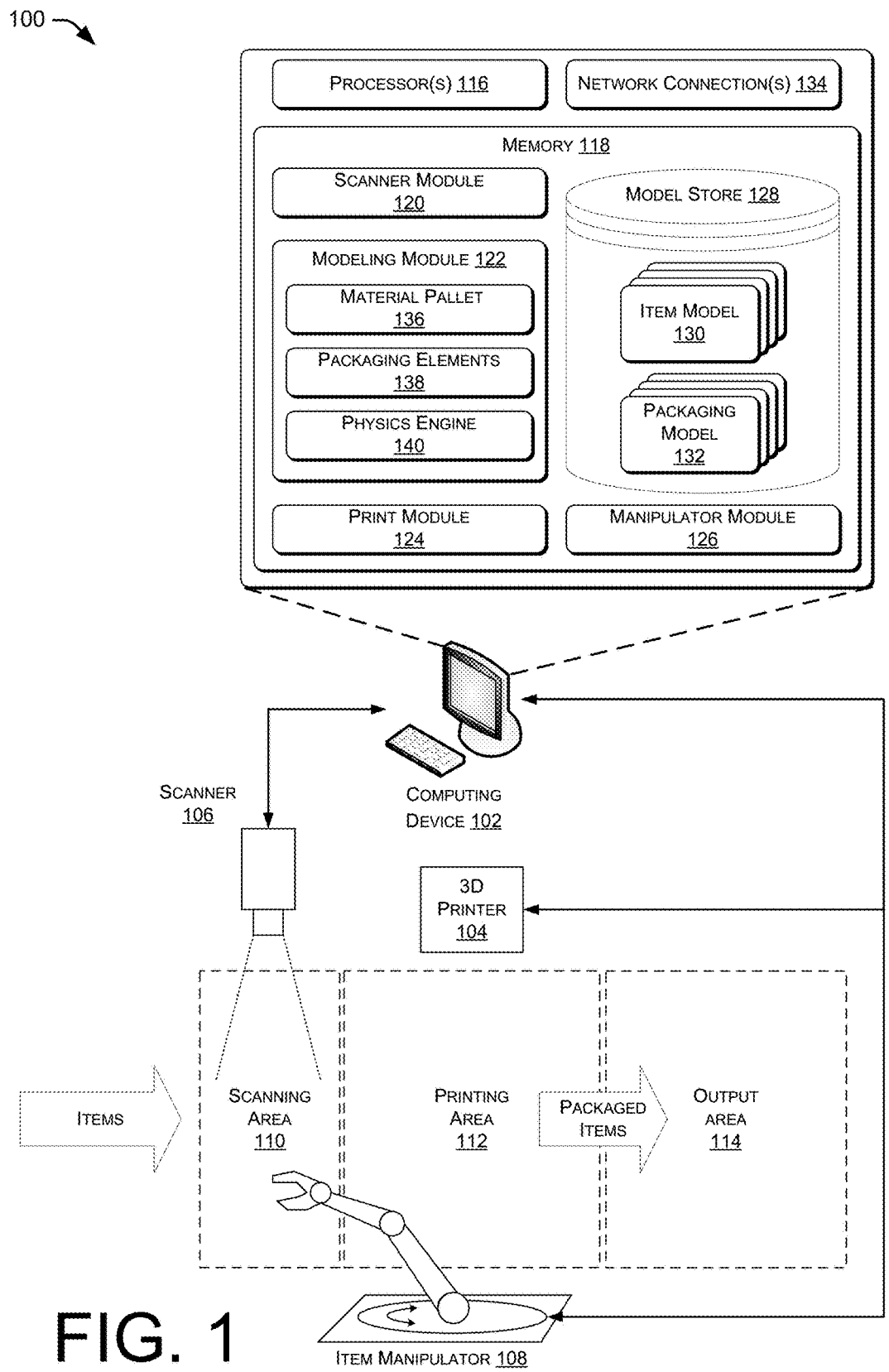
FIG. 1 is a schematic diagram of an example 3-D printed packaging system usable to package items using 3-D printing.

This application describes using 3-D printing or other additive manufacturing techniques for retail packaging (i.e., packaging of a product prior to sale by a manufacturer, distributor, or the like) and/or non-retail packaging (e.g., packaging for storage, shipping, or the like). As used herein, the term non-retail packaging refers to any packaging for storage and/or shipping, whether performed before or after a sale to a consumer. That is, non-retail packaging includes shipping from a manufacturer to a customer, shipping from a manufacturer to distributor, shipping from a distributor to a customer, shipping from any image individual to another, and/or packaging item(s) for storage.

In some instances, the techniques described herein may be used to generate retail packaging for new products and/or existing products (e.g., repackaging of products with damaged or opened packaging, to refresh or update packaging, to package the product for a new or different market, to add additional or alternative packaging features, etc.). The techniques described herein may additionally or alternatively be used to generate non-retail packaging for products and other items (unpackaged items, items packaged using conventional retail packaging techniques, and/or items packaged using the retail packaging techniques described herein). In some instances, the techniques described herein may be usable to generate packages that serve as both retail packaging and non-retail packaging. Additionally, in some examples, the techniques described herein may be used in conjunction with 3-D printing of products themselves. For instance, after printing a product using 3-D printing techniques, a retail or non-retail package may then be printed for the product. The package may be printed as part of a same printing operation as the product itself, or as a separate printing operation in the same or different printing area.

In the course of printing items and/or packages, data is generated or obtained regarding the items and packages being printed. In addition, information about customers ordering or shipping the items, payment information, shipping and destination information, and/or information about recipients of the items and packages may be obtained in order to fulfill a customer order and/or ship the packages to their recipients. By capturing and integrating this data early in the packaging process (when the order is received, as opposed to when the shipping label is created or the item is scanned after being dropped at a shipping location), delivery routes and other capacity variables can be addressed, adapted to, and managed more efficiently, potentially saving time and reducing fuel labor and/or costs. For instance, a shipper could know exactly how many packages are at a certain pickup location, how much they weigh, how large they are, and where they are destined. Thus, the shipper can deploy the most efficient vehicle to pick up the packages avoiding wasted fuel by sending a larger vehicle than necessary. This will result in more efficient deliveries—reducing time, cost, and waste in the shipping portion of the process. In another example, packages can be pre-sorted according to attributes important to the carrier (size, destination, priority status, etc.), saving both time and costs on downstream logistics. In yet another example, this data can be used to predict demand for various logistics and delivery capacity, enabling capacity planning that will support delivery at an optimal balance of speed and cost to the shipper.

While many of the examples are described as using 3-D printing and/or being implemented by a 3-D printer, the techniques described herein are also applicable to other forms of additive manufacturing. Unless specifically noted to the contrary, the terms "3-D printing" and "3-D printer" are used herein to mean additive manufacturing and additive manufacturing machines, respectively.

Example 3-D Printed Packaging System

FIG. 1 illustrates a 3-D printed packaging system 100 usable to implement 3-D printed packaging of items. The system 100 may be used to provide retail packaging for products that are for sale to consumers. The system 100 may additionally or alternatively be used to provide non-retail packaging for other items. In the case of non-retail packaging, the items may or may not already include some packaging (e.g., retail packaging).

As shown in FIG. 1, system 100 includes a computing device 102 in communication with a 3-D printer 104. In the illustrated example, the system 100 also includes a scanner 106 and an item manipulator 108. However, in other examples, the scanner and/or manipulator may be omitted or combined with each other, the 3-D printer 104, and/or computing device 102. When present, the scanner 106 may comprise a 3-D optical scanner, a 3-D laser scanner, and/or one or more cameras to obtain information about an item, such as its visual appearance, outer dimensions, or the like. Numerous different scanners are available, such as, for example, the exaCT-s® CT Workstation or the Shapetracer Laser Line Scanner, both available from Wenzel America of Wixom, Mich., or the Artec Spikder, Artec L, or Artec EVA 3-D Scanners available from Artec Group of Palo Alto, Calif. In some examples, the scanner 106 may additionally or alternatively comprise an ultrasound scanner, an x-ray scanner, a spectrometer, a scale, and/or other scanning or sensing equipment to determine interior characteristics of the item, materials from which the item is made, weight of the item, volume of the item, density of the item, and the like.

In some examples, the computing device 104 may "recognize" the item based on the scan. The computing device 104 may recognize the item by, for example, reading a product identifier (e.g., universal product code or "UPC", model number, serial number, bar code, quick response code, or other identifier) of the item (if available), and then query a product catalog, model store, or other database to obtain additional information about the item. The computing device 102 may additionally or alternatively recognize the item using object recognition (e.g., by comparing the scan or a vector representation of the scan to a database of reference scans or images of items). Once an item is recognized, the computing device 104 may obtain additional information about the item such as a computer model of the item, a textual description of the item, product reviews of the item, human input information about the item, web pages related to the item, or any other available information about the item.

The item manipulator 108 may comprise a robotic arm or other computer controlled manipulator. In some examples, the item manipulator 108 may be specialized to move the item within the system 100. For instance, the item manipulator 108 may include specialized hardware (e.g., item engaging tools designed specifically for a particular type or shape of item) and/or software (e.g., customized code for a particular operation or set of operations). In that case the item manipulator 108 may be capable of limited and/or predetermined motions. However, in other examples the item manipulator 108 may comprise a robotic arm with a configurable or articulatable item-engaging tool or other manipulator having multiple degrees of freedom and capable of a wide range of motion. Numerous different manipulators are available depending on the specific tasks to be performed. In one specific example, a six-axis robotic arm, such as the Adapt Viper line of robotic arms available from Adept Technology, Inc. of Pleasanton, Calif. In some embodiments, the item manipulator 108 may additionally or alternatively comprise a conveyor belt, rollers, or other mechanisms to move items from one location and/or orientation to another.

The computing device 102, 3-D printer 104, scanner 106, and/or item manipulator 108 are in communication with one another over a wired and/or wireless network. The network of system 100 may be further connected to one or more other local and/or wide area networks, such as the Internet.

When an item is received, the item may be placed in a scanning area 110, where the item may be scanned by the scanner 106 to determine the nature of the item. Once the item has been scanned and the system 100 has determined the nature of the item to be packaged, the item may be moved to a printing area 112 where the item will be packaged. The item may be packaged alone or with one or more other items (e.g., other items that are part of a same order and/or are to be shipped to the same location). Once the item(s) are packaged, the packaged item(s) may be output to an output area 114 for storage, shipping, and/or further processing. The following description describes the process of packaging a single item. However, it should be understood that the process may also be used to print packaging for/around multiple items.

The computing device 102 comprises one or more processors 116 and memory 118. The processor(s) 116 may comprise one or more microprocessors (e.g., central processing units, graphics processing units, etc.), each having one or more processing cores, one or more microcontrollers, or the like. The memory 118 may be configured to store one or more software and/or firmware modules, which are executable by the processor(s) 116 to implement various functions. While the modules are described herein as being software and/or firmware executable by one or more processors, in other embodiments, any or all of the modules or functional blocks may be implemented in whole or in part by hardware (e.g., as an application specific integrated circuit or "ASIC," a specialized processing unit, a field programmable gate array or "FPGA," etc.) to execute the described functions. The memory 118 may comprise computer-readable media and/or devices and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors or circuits of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media includes hardware and does not include modulated data signals or carrier waves.

Referring back to FIG. 1, the memory 118 includes a scanner module 120, a modeling module 122, a print module 124, and manipulator module 126, and a model store 128. The scanner module 120 may provide an interface (e.g., driver, application programming interface or "API," or the like) to the scanner 106. For instance, the scanner module 120 may provide commands to control the scanner 106 to obtain information about the item. The scanner module 120 may additionally receive the output of scanner 106 (i.e., the scanned image(s) or sensor data captured by the scanner 106). From the output of the scanner 106, the scanner module is able to generate an item model 130 (if one did not already exist) or may select and/or supplement an existing item model 130 (if one already exists). Once generated, selected, and/or supplemented, the item model 130 may be stored in the model store 128 or other repository for subsequent access by local and/or remote computing devices.

The modeling module 122 generates a computer model of the packaging that is to be applied to the item. In other words, the modeling module 122 determines the geometry and layout of the package that should be used to package the item, taking into account the item model 130. The modeling module 122 generates a packaging model 132 describing the geometry layout of the package. The packaging model 132 may be stored in the model store 128. While the item models and packaging models are both shown as being stored in model store 128 in this example, in other examples the item models and packaging models may be stored separately in memory 118 or at one or more other data stores in communication with the computing device 102. The modeling module 122 may be a stand alone module, or may be a part of, an add-on to, or may otherwise integrate with, a 3-D modeling program such as SolidWorks available from Dassault Systèmes SolidWorks Corp. of Waltham, Mass., Pro-Engineer available from PTC of Needham, Mass., or the like.

Print module 124 may provide an interface (e.g., driver, application programming interface or "API," or the like) between the computing device 102 and the 3-D printer 104. For example, the print module 124 may include a printer driver and may provide commands controlling a print head of the 3-D printer. Print module 124 may control the 3-D printer 104 to generate packaging for the item according to packaging model 132. The print module 124 may control, among other things, the material or materials from which the package is to be printed, print speed of a print head of the 3-D printer 104, size and shape of packing material and/or an outer surface or shell of the package.

The manipulator module 126 may provide an interface (e.g., driver, application programming interface or "API," or the like) between the computing device 102 and the item manipulator 108. For example, the manipulator module 126 may be usable by the computing device 102 to direct the item manipulator 108 to move the item before, during and/or after printing the package. For instance, the manipulator module 126 may direct the item manipulator to place the item into the scanning area 110, to rotate or otherwise move the object in the scanning area 110, to move the object from the scanning area 110 into the printing area 112, to rotate or otherwise move the object in the printing area 112, and/or to remove the item from the printing area 112.

The computing device 102 also includes one or more network connections 134 to connect the computing device 102 to the other devices in the system 100, as well as to one or more other local and/or wide area networks. In some examples, the network connections 134 may allow a user, such as a purchaser of an item, to specify how the item is to be packaged for shipping to the purchaser or another intended recipient.

When the item is placed in the scanning area 110, the scanner 106 may scan the item. From the scan, the computing device 102 may obtain information to determine the nature of the item from one or more sources. For instance, as discussed above, the computing device 102 may recognize the item based on a product identifier or based on object recognition. If the computing device 102 recognizes the item, the computing device 104 may query one or more data sources to obtain additional information about the item. For instance, the computing device 102 may reference the model store 128 to determine whether or not a computer model of the item exists. If a computer model of the item exists, the computing device 102 may reference an item model 130 corresponding to the item to determine the geometry, materials, weight, volume, density, and/or other characteristics of the item. If a computer model of the item is not available, the computing device 102 may scan the item using scanner 106 to determine one or more characteristics of the item. In some instances, the computing device 102 may have or be able to obtain (e.g., through external resources via the Internet) a complete item model 130 including exterior dimensions, interior dimensions, weight, volume, density, materials of construction, surface finish, and the like. In other instances, the computing device 102 may have a limited or partial item model 130, which describes less than all characteristics of the item. For instance, a limited or partial item model might only include exterior dimensions of the item.

Based on item model 130 the item, modeling module 122 may construct or obtain (e.g., through external resources via a network such as the Internet) a packaging model 132 for the item. The modeling module 122 may include a material palette 136 defining the materials that are available from which to construct a package for the item. The modeling module 122 may further include one or more packaging elements 138, such as templates and previously stored design elements. For instance, packaging elements 138 may include computer models of ribs, flanges, honeycomb structures, bubble structures, trusses, or other design elements, features, or parts. The modeling module 122 may also include a physics engine 140 to model forces that are likely to be applied by and/or to the item during storage, shipping, and/or sale. In one example, the physics engine 140 may take into account characteristics of the item (e.g., size, shape, weight, fragility/durability, etc.) based on the item model 130, material properties (e.g., strength, elasticity, ductility, hardness, etc.) of the item and available packaging materials from the material pallet 136, forces to which the item may be exposed (e.g., gravity, inertia, impact, air resistance, etc.), and/or other factors (e.g., price, scarcity, shipping mode, storage location, intended use, etc.) obtained from item catalogs, product reviews, web sites, and/or other sources. In some instances, the physics engine 140 may obtain such information for an item at least in part from a product identifier of the item. The foregoing description is of just one example, and in other examples, the physics engine 140 and modeling module 122 may obtain information needed to perform their respective functions directly or indirectly from the enumerated sources, or from other available sources.

Based on the foregoing criteria, modeling module 122 may generate the packaging model 132 customized for the item to withstand the forces that are likely to be applied. For example, the physics engine 140 may determine that, based on a strength and weight of the item and a distance that the item is likely to be dropped during shipping, the packaging should be able to withstand a certain impact force. In another example, the physics engine 140 may determine that, based on the strength and weight item and a number of items that are commonly stacked on top of one another, the packaging should be able to support a certain static load. In some examples, the physics engine 140 may employ finite element analysis (FEA) or other mathematical techniques to model static and/or dynamic systems in which the item may be used/stored/shipped and/or the forces to which the item is likely to be exposed.

In other examples, instead of computing the forces to which the item is likely to be subjected, the physics engine 140 may categorize the item into one or more categories and may apply predetermined packaging rules, designs, or templates corresponding to the one or more categories. For instance, if the item has a density less than a certain threshold the physics engine 140 may categorize the item as being a "light weight" item. The physics engine 140 may further categorize the item as being a "fragile" item if, for example, it has relatively thin spans of material, is made of a brittle or low strength material, or is for other reasons susceptible to damage. The physics engine 140 may then identify (e.g., from a look up table or matrix) one or more packaging structures to use for the item based on the categorizations of "light weight" and "fragile." The physics engine may further modify or customize the packaging structures based on, for example, the size, weight, or other characteristics of the item. For instance, the physics engine 140 may determine a packing structure or combination of packing structures (e.g., bubble and web structures in this example) to use to package an item based on its categorization (e.g., "light weight" and "fragile"). The physics engine 140 may then adjust the number of packing structures (e.g., number of bubbles and/or webs, in this example), size of packaging structures (e.g., width, height, thickness, diameter, etc.), quantity of material used to generate the packing structures (e.g., mass or volume), the material from which the packing structures are constructed (e.g., hard plastic, elastomer, metal, etc.), and/or other characteristics of the packing structures (e.g., corner rounding, gussets, fillets, etc.) according to the characteristics of the item. In some embodiments, the physics engine 140 may additionally or alternatively take into account the value of the item, constraints on the cost of the package (e.g., what the customer is willing to pay), constraints on the size and/or weight of the package (e.g., due to postal or other delivery requirements), or other considerations.

In some examples, before and/or after the item is placed in the printing area 112, the item may have a release applied so that the 3-D printed packaging does not stick to or damage the item. In one example, the computing device 102 may instruct the item manipulator to apply the release to the item, while in other examples the release may be applied to the item by another device or process prior to or after being placed in the printing area 112. In some examples, the release may comprise a chemical or material (e.g., corn starch, wax, paper, metal foil, Teflon, oil, etc.) applied to item to prevent the 3-D printed packaging material from adhering or bonding to the item. In other examples, the release may comprise a property imparted to the item (e.g., an electrostatic charge, a polished surface finish, a cold temperature, electromagnetic radiation, etc.) that helps to prevent the 3-D printed packaging material from adhering or bonding to the item. In still other examples, the release may be omitted (e.g., if the 3-D printed packaging material does not adhere to the material of the item, if a gap is maintained between the item and the 3-D printed packaging material during printing, and/or if it is desired that the 3-D printed packaging material adhere or bond to the item). In still other examples, a release may be applied to some parts of an item but not other parts, such as limited corners or edge points of the item to allow the package to adhere to, or form a weak bond with, the item (e.g., to secure the package to the item during shipping). In such an example, the limited corners or edge points that are not coated with the release may be sized and positioned such that the adhesion or weak bonds may be easily broken upon opening the package to separate the item from the package. The release may be applied before, during, or (in the case where part of the package is printed before the item is placed in the printing area) after the printing process commences.

Once the packaging model 132 has been generated and the item is otherwise ready for packaging (e.g., any desired release has been applied, any other items that are to be packaged with the item are present, etc.), the computing device 102 may initiate the printing process. In some examples, the item may be placed in the printing area 112 before printing commences and the package may be printed around the item. In other examples, at least a portion of a package may be printed before the item is placed in the printing area 112. For instance, the computing device 102 may instruct the 3-D printer 104 (e.g., via print module 124) to print a bottom or side surface and/or one or more support structures of a package prior to instructing the item manipulator 108 (e.g., via the manipulator module 126) to place the item into the printing area 112. The item manipulator 108 may then place the item into/onto the partially printed package (e.g., onto already printed support structures and/or into an already partially printed shell of a package), the computing device 102 may then cause the 3-D printer 104 to print the remainder of the package around the item.

In some examples, the package printed by the printing process may be one continuous part. In that case, the package may completely encapsulate the item or may cover only part of the item. In the case that the package encapsulates the item, the package may provide an air and/or water tight package. In some examples, the package may be hermetically sealed. Because the package is 3-D printed, the package may be seamless, minimizing chances that the package will catch on surfaces it comes into contact with and consequently minimizing the chances of damage to the package or the surfaces with which it comes into contact. The seamless surfaces of the package may also improve material handling capabilities. For instance, the seamless surfaces of the package may make the package easier to slide on conveyors, easier to pick up (e.g., with suction devices or grippers), easier to stack and load, etc. The seamless appearance may also provide a clean, aesthetically appealing appearance.

In other examples, the package maybe printed as multiple parts to facilitate opening or unpackaging the item. For instance, the package may comprise multiple parts that fit together like a 3-D puzzle and/or are held in place by one or more other parts. Additionally or alternatively, the package may include one or more opening features to help assist in the opening of the package. By way of example and not limitation, the package may include one or more thinned or frangible regions where the package is configured to separate during opening, one or more tabs or finger holds configured to be grasped by a user, or the like.

The package may additionally or alternatively include one or more of the following features:

- thermal insulation (e.g., regions of material having a low coefficient of thermal conductivity such as wood, polystyrene, cellulose or glass fiber insulation, air or other gasses, and/or a vacuum) and/or electrical insulation (e.g., dielectric material);
- vibration damping (e.g., regions of viscoelastic material such as rubber, silicone, synthetic polymers, wood, or composites including any of the foregoing);
- crumple zones (e.g., features designed to fail before the rest of the package) to absorb energy of impacts;
- child safety features (e.g., features requiring more strength, instruction reading ability, and/or dexterity to open than a typical child possesses);
- tamper resistant and/or tamper evident features (e.g., features that will clearly show once the package has been opened or tampered with, such as for example, 2-D or 3-D water marks, frangible regions that will break if tampered with, materials or indicators that change color or otherwise indicate when they are exposed to air or humidity, ink or dye in the package that if punctured will discolor the package indicating the tampering);
- desiccant material (e.g., received in pockets, pouches, or receptacles printed in the package and/or the package itself may be printed in whole or in part of a desiccant material);
- all or part of the package may form an accessory for the item (e.g., a charging stand for an electronic device, a cover for an electronic device, a pill holder for medication, etc.); and/or
- the package may be made in whole or in part of a recyclable material (e.g., thermoplastic, glass, metal, ceramic, etc.), biodegradable material (e.g., cellulose based materials, sand with organic binder such as glycerin, etc.), and/or water soluble material (e.g., sucrose, glycerin, corn starch, gelatin, etc.) such that the entire package may be recycled and/or disposed of without any subsequent sorting or separating.

During or after 3-D printing the package structure, one or more pieces of information may be printed onto the package. The information may include, for example, shipping information (e.g., sender and/or recipient address), postage for the package, a packing list of the item(s) in the package, shipping instructions (e.g., "fragile", "this end up," etc.), opening instructions, set up or assembly instructions, "quick-start instructions," description of features of the package (e.g., child safety, desiccant, etc.), warning labels (e.g., hazardous materials), a list of materials from which the package is constructed, a packaging license (e.g., "by opening this package you agree to be bound by the terms . . . "), a machine readable code (e.g., quick response code, bar code, 3-D relief code, or the like), a date on which the package was printed, a location at which the package was printed, an entity that printed the package, an identifier of the printer that printed the package, or any other pertinent information. The information may be printed in 2-D or 3-D by the 3-D printer 104 or by a 2-D printer located in or proximate the printing area 112.

Hybrid 3-D Printed/Conventional Packaging

In some examples, 3-D printed packaging may be combined with one or more conventional packaging techniques to result in one or more hybrid techniques. In one example, the package may comprise a preprinted or preformed container, such as a cardboard box. A 3-D printed package or portion of a 3-D printed package (e.g., packing material) may be placed in or printed in the preprinted or preformed container. For instance, in one simple example 3-D printed packing material may be printed around an item, the item enclosed in the packing material may then be placed inside the preformed container. Alternatively, the preformed container may be placed in the printing area 112, a portion of packing material may be printed within the container, and an item may be placed in the container and the partially printed packing material, and a remaining portion of the packing material may be printed around the item within the container.

In another example, a conventionally packaged item may further have a 3-D printed package printed around the conventional package. For instance, an item may be packaged in conventional packing materials such as bubble wrap, tissue paper, or the like and/or may be placed in a conventional container such as a cardboard box. The conventionally wrapped item may then be placed into the printing area 112, and a 3-D printed package including a shell and/or packing material may be printed around the conventionally packaged item.

Example Packing Structures

As discussed above, structure of package may be based upon the fragility of the item, the weight of the item, the shipping distance, shipping mode, and/or the value of the item. For instance, fragile items may be packaged with a more protective structure of packing material than sturdy items. Heavy items may be packaged with a more robust structure of packing material than light weight items. The shipping distance, shipping mode, and value of the item may also be taken into account, with further distances and higher values resulting in more robust packing structures than shorter distances and lower values. Likewise, certain shipping modes (e.g., freight, bulk rate, etc.) may result in more robust packing than others (e.g., airmail, courier, autonomous aerial vehicle or drone, etc.). The robustness of a package may be adjusted by adjusting one or more of the type of support structure (e.g., lattice structure, a honeycomb structure, a truss structure, a bubble structure, one or more support ribs, web structure, loose particles or fibers, etc.), quantity of packing material (e.g., volume, mass, thickness, etc.), material used for packing material (e.g., plastic, rubber, silicone, silicon, glass, metal, stone, composites of any of the foregoing, etc.), and/or characteristics of the packing material (e.g., strength of material, hardness, toughness, elasticity, vibration damping ability, thermal insulating ability, etc.).

Multiple different packing materials and/or support structures may be used to package the item. For example, different support structures and/or crumple zones may be used in different portions of the package. For example, a relatively hard and/or rigid inner support structure may be formed immediately around (e.g., directly surrounding) the item, while a softer and/or more flexible material may be formed around the inner support structure, or vice versa.

Example Data Aggregation System

Figure 2:
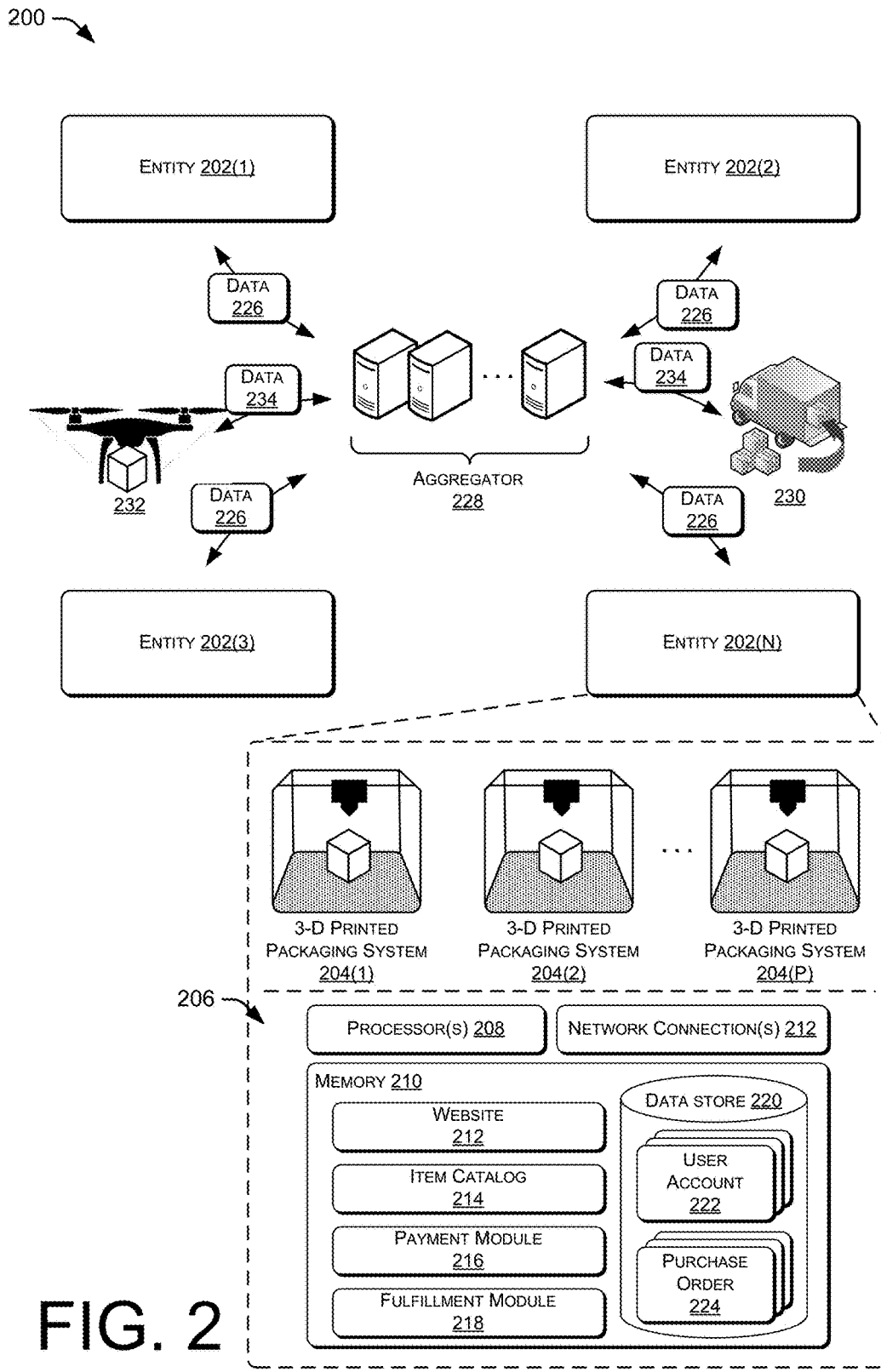
FIG. 2 is a schematic diagram of an example system including multiple merchants or other entities having 3-D printed packaging systems.

FIG. 2 is a schematic diagram illustrating an example data aggregation system 200 including one or more merchants or other entities 202(1), 202(2), 202(3), . . . 202(N) (collectively "merchants 202"), where N is any integer greater than or equal to 1. The entities 202 may be e-commerce merchants, brick and mortar stores, fulfillment centers, warehouses, a packaging station or kiosk, or the like. By way of example and not limitation, the entities may be retailers selling new and/or used items, shipping companies (e.g., UPS, FedEx, DHL, etc.), airlines, trucking companies, office supply companies auction services, shopping malls, or service providers. Each of the entities includes one or more 3-D printed packaging systems, such as the 3-D printed packaging system 100 of FIG. 1. The 3-D printed packaging system(s) may be the same or different than each other. As in the example of FIG. 1, the 3-D printed packaging system(s) may include a computing device 102, a scanner 106, and/or an item manipulator 108 in communication with a 3-D printer 104. The 3-D printed packaging system(s) of each entity may operate independently of each other, may work collaboratively, and/or may share common resources or areas. For instance, an entity may include multiple 3-D printed packaging system(s), each having its own 3-D printer, but with an item manipulator moving items to, from, and/or between multiple 3-D printers.

As another example, after being scanned in a scanning area, a computing device may select which 3-D printer from among multiple 3-D printers to print a package for each item. The 3-D printer may be selected based on, for example, the item to be packaged, the type of package to be printed, type of packing material to be printed, the weight of the item to be packaged, size of the package to be printed, size of printing queues of the multiple 3-D printers (e.g., the item may be sent for printing to a printer with the shortest printing queue), a time at which the package is scheduled to be picked up for delivery, how well the package for the item will fit relative to other packages printed by the printer, or other factors. Each respective item may then be moved by one or more item manipulators to the selected 3-D printer for printing packaging. Subsequently, packaged items from multiple different 3-D printers may be output to a common output area for further processing or pickup.

In some examples, multiple 3-D printers may operate on a package in series (i.e., one printer prints a first part of a package and then one or more other printers subsequently print additional portions of the package using a same or different printing technologies). For example, the first 3-D printer may print a first portion of the package using FDM to print a frame work or shell of the package, while another printer subsequently prints an additional portion of the package using a higher speed 3-D printing technique (e.g., CLIP—Continuous Liquid Interface Production available from Carbon 3D, or ILI™, Intelligent Liquid Interface available from NewPro3D), a vacuum forming technique, a traditional packaging technique, or the like.

As shown in FIG. 2, example entity 202(N) includes 3-D printed packaging system 204(1), 3-D printed packaging system 204(2), . . . 204(P) (collectively "3-D printed packaging systems 204"), where P is any integer greater than or equal to 1. The entity 202(N) may also include one or more computing systems 206 including one or more processors 208, memory 210, and one or more network connections 212, which may function the same as or similar to the corresponding components described with reference to FIG. 1. The computing system(s) 206 may be implemented using one or more local computing resources (e.g., computers, servers, etc.) and/or remote (e.g., cloud-based resources). In some examples, the computing system(s) 206 may be distributed across multiple local and/or remote computing resources.

The memory 210 may include one or more applications or modules. In the illustrated example, the memory 210 includes a website 212 hosted by the computing system(s) 206. The website 212 may correspond to an e-commerce website offering one or more new or used items for purchase from one or more merchants. The website 212 may provide access to an item catalog 214 including item detail pages listing items available for purchase from the one or more merchants. The item detail pages of the item catalog 214 include information about the items available for purchase, such as a name of the item, a model name and/or number of the item, a description of the item, reviews of the item, a machine readable code for the item (e.g., bar code, QR code, etc.), and/or a computer model (e.g., design drawings or solid model) of the item. A payment module 216 may include functionality and interfaces to receive payment for items purchased from the item catalog 214 via from the website 212. The payment module 216 may receive payment information (e.g., credit card numbers, bank account information, billing address, etc.) from customers purchasing items via the website 212. A fulfillment module 218 may receive customer information, order information (e.g., items ordered, number of items ordered, information about the items, etc.), shipping information (e.g., selected shipping speed, shipping carrier, etc.), recipient information (e.g., name, address, birthdate, etc.), and other data usable to fulfill the customer's order and ship the item to its destination.

A data store 220 stores various data generated by and/or accessible to the computing system 206. Among other things, data store 220 stores data regarding user accounts 222 and purchase orders 224. The user accounts 222 may include data regarding customers that have registered with the entity 202(N), such as customers, recipients, sellers, shippers, carriers, reviewers, or the like. The user accounts 222 may include names, login credentials (e.g., user name, password, security questions, tokens, or other credentials), contact information (e.g., email addresses, phone numbers, mailing addresses, etc.), demographic information (e.g., age, gender, etc.), payment credentials (e.g., credit cards, bank accounts, etc.), birth dates, preferences, purchase history, return history, browsing history, user recommendations, medical history, drug allergies, prescriptions, or any other information reasonably related to the business of the entity 202(N). Each purchase order 224 may include a record of a purchase of one or more items, and may include payment information for the transaction, shipping information, recipient information, characteristics of the item(s) included in the order, models of the item(s) included in the order, models of the package(s) to package the item(s) in the order, and the like.

The foregoing examples are merely illustrative, and the entities 202 and their 3-D printed packaging system(s) can be configured according to any of these or other variations.

Data 226 may be captured from each of the entities 202 and transmitted to an aggregator 228. The data 226 may include any or all of the data generated and/or stored by the entities 202 (e.g., 3-D printed packaging system 100, computing system 206, etc.). In some examples, the aggregator 228 may be a merchant store, a shipping or logistics company, and/or a provider of some or all of the 3-D printed packaging systems employed by the entities 202. By collecting data 226 from as many entities as possible the aggregator 228 can gain insight into real-time global commerce, knowing not only what was purchased, but also from where, to whom it was shipped, how much it weighs, how big the package is, and/or any of the other information related to the customer, recipient, shipper, items, package, described herein. The aggregator can then send data and/or instructions back to the entities 202 based on these insights. This level of understanding in the real-time or near-real-time supply chain allows the aggregator 228 to adjust delivery schedule, schedule package pickups and/or deliveries, reroute trucks, bundle packages, and/or otherwise adapt and manage logistics with much greater precision. For example, based on the data 226, the aggregator 228 can determine in substantially real-time which truck 230 or drone 232 to deploy to which retailer 202 and can transmit data and/or instructions to the respective truck 230 and/or done 232 to effectuate the desired actions. Specifically, the aggregator 228 may be able to determine the volume and/or weight capacity of truck needed to pick up all of the packages from a given entity. Additionally or alternatively, the aggregator 228 may determine how many drones will be required to deliver the packages from a given fulfillment center to their recipients. Still further, the aggregator 228 can determine the best routes to allow the trucks 230 and/or drones 232 to deliver their packages in the shortest distance and/or in the fastest time. In some examples, the trucks 230, drones 232, couriers, aircraft, and other delivery vehicles (any or all of which may be autonomous or driven by humans) may transmit data 234 back to the aggregator 228, including estimated delivery times, travel times, traffic information, delivery status (e.g., in transit, delivered, signature or other confirmation of delivery, delivery declined/rejected, returned, etc.), delivery times, package status (e.g., lost, damaged, stolen, etc.), or any other information regarding the package, its contents, recipient, etc. These and numerous other optimizations are possible and will result in more efficient deliveries—reducing time, cost, and waste in the shipping portion of the process. The two-way arrows between the aggregator 228 and the entities 202, and between the aggregator 228 and the trucks 230 and drones 232 indicate that data, instructions, and other information can be transmitted in both directions (to and from the aggregator 228).

In some examples, the aggregator 228 may be able to adjust, broker adjustments, or suggest adjustments, to transactions to more efficiently fulfill orders, minimize transit times and/or distances, or otherwise optimize the shipping and/or fulfillment process. For instance, based on the data 226 received from the various entities 202, the aggregator may determine that two different customers in two different geographical areas have ordered the same product from different entities. Consider an example scenario in which a first customer in a first location (e.g., California) purchases a product from a first company, which has the product in a warehouse in a second location (e.g., New York). Within a threshold amount of time (e.g., within 8 hours, 24 hours, etc.) before or after the first purchaser purchases the product and before the first company has shipped the product, a second customer in a third location (e.g., New Jersey) orders the same product from second company that has the product in a fourth location (e.g., Oregon). Traditionally, the first company would ship the product from its warehouse at the second location to the first customer at the first location (i.e., from California to New York in this example), and the second company would ship the same product from its warehouse at the fourth location to the second customer at the third location (i.e., from Oregon to New Jersey in this example). However, this traditional or default scenario is not efficient since the second company's warehouse is closer to the first customer, and the first company's warehouse is closer to the second customer. Thus, two identical products are unnecessarily shipped across the country at considerable expense and causing unnecessary delay in delivery of the product to the customers.

If, on the other hand, the first and second companies in the preceding scenario correspond to entities 202(1) and 202(N) that employ the 3-D printed packing systems 204 described with reference to FIG. 2, these inefficiencies can be eliminated. In that case, when the first and second companies receive their respective orders from the first and second customers just as in the traditional/default scenario. However, in this example, data 226 regarding the orders including, among other things, information about the item purchased and the origin and destination locations of the respective items, is also transmitted to the aggregator 228. Based on this data 226, the aggregator 228 can determine that the default scenario is not the most efficient way of fulfilling the orders. Based on this determination, in some examples, the aggregator 228 may suggest to the respective companies (entities 202(1) and 202(N)) that they each fulfill the other's order (i.e., the first company ships the product from its New York warehouse to the second customer in New Jersey, and the second company ships the product from its Oregon warehouse to the first customer in California). In some examples, this may be accomplished by each company subcontracting with the other company to fulfill the order on its behalf. In some examples, the aggregator 228 may provide a web interface or other mechanism to facilitate or broker this subcontracting arrangement between the first and second companies. In some examples, the first and second companies may agree ahead of time to allow the aggregator 228 to make such a change independently if the change meets one or more criteria (e.g., the change results in lower shipping cost, faster shipping time, shorter shipping distance, net cost savings or other benefit to the respective company). In that case, the aggregator 228 may transmit alternate fulfillment instructions to the respective entities. The alternate fulfillment instructions may include alternate packaging and/or shipping information for the items. Based at least in part on the alternate fulfillment instructions, the 3-D printed packaging systems at the respective entities may be instructed (e.g., by the aggregator 228 or by the computing systems 206 of the respective entities) to print the packages to fulfill the other company's order (i.e., the entity of the first company prints a package to ship to the second customer and the entity of the second company prints a package to ship to the first customer). Employing one or more of the foregoing techniques, the shipping costs and/or times can be substantially reduced relative to the default scenario. Another example related to this scenario allows the shipper to orchestrate dynamic re-routing of packages wherein the recipient can be compensated for allowing a schedule change that is more efficient for the shipper. In this example, the shipper may receive a rush order that offers them the opportunity to capture increase revenue, but only if they can delay the delivery of the first order. Utilizing the data channels described in the previous examples, the shipper may offer the recipient of the delayed delivery compensation (financial, credit towards future product purchase, etc.) in such a way as to not miss out on revenue opportunities from reordering deliveries to fulfill the higher priority order. This dynamic auction capability, at scale, can create a pricing market whereby recipients who are willing to pay more for even faster shipping can receive that benefit, and recipients willing to wait for delivery can lower their shipping costs, all while allowing the shipper to capture more revenue on each delivered package.

In a related example, changes to the packaging can be performed dynamically while en-route. This capability facilitates the dynamic re-routing of packages in several scenarios. For instance, if Item A is in transit to Customer A, but a rush order (i.e. Same Day, or Within 1 Hour) is placed for Item A by Customer B, the compensation model above can be utilized to dynamically negotiate appropriate compensation for Customer A, while the packaging is modified to be redirected to Customer B. These capabilities are further supported by the data flows between packages and the centralized data stores to allow retailers to offer purchasing opportunities that would otherwise not be possible. For example, if a customer is shopping for an item and the retailer is aware that such an item is already on a delivery vehicle near the customer's location, they can offer the customer the opportunity for immediate delivery. If ordered, the compensation process for the original recipient takes place, the packaging is modified to reflect the new recipient, the item is delivered quickly to the second customer and an additional item is dispatched (or dynamically re-routed from another customer) to the original purchaser. This dynamic re-routing capability allows retailers and shippers to essentially utilize their delivery vehicles as a flexible extension of their supply chain, moving items to new locations in immediate response to customer demands.

Multiple Package Examples

As discussed above, in some examples, multiple items may be packaged concurrently or sequentially. In the case where the items are to be packaged in multiple packages, the size, shape, and configuration of one or more of the packages may be based at least in part on the size, shape, and configuration of others of the multiple packages. For instance, if multiple packages are to be placed on a pallet or other support surface, the size, shape, and/or configuration of some or all of the packages may be chosen at least in part to result in a uniform, well-packed unit of packages. A uniform, well-packed unit of packages is one that is stable (i.e., won't topple over) and is substantially free of voids, gaps, and open spaces between packages. However, uniform, well-packed unit of packages need not be completely free of voids, gaps, and open spaces. For instance, a uniform, well-packed unit of packages may include voids, gaps, and open spaces to provide clearance to fit hands or package handling tools between packages, to provide clearance for assembly or disassembly of packages to/from the unit of packages, to allow for expansion or contraction of the packages, or the like. In some examples, a uniform, well-packed unit of packages may be substantially cube shaped or rectangular prism shaped. However, in other examples, a uniform, well-packed unit of packages may take on other shapes.

In some examples, all of the packages making up the unit of packages may be configured based at least in part the other packages in the unit of packages. In other examples, a limited number of the packages (e.g., a single package, corner packages, a row of packages, etc.) in the unit of packages may be configured based in part on a remaining space on a pallet or other support surface. In that case, size and shape of the limited number of packages may be modified (relative to the otherwise optimal size and shape for the package) to fill a remaining space on a pallet or other support surface (or a row of stacked packages) to result in a uniform, well packed unit of packages. In either of the foregoing examples, the computing device 102 may take into account the size and shape of multiple packages in a queue of packages to be printed when creating new package models. Furthermore, as new packages are added to the queue, the computing device 102 may modify or adjust the size and shape of one or more other packages in the queue in order to create a uniform, well-packed unit of packages.

In still other examples, the computing device 102 can receive information or instructions from another 3-D printed packaging system of an entity and/or from aggregator 228, and may print packages based at least in part on the information or instructions from the other 3-D printed packaging system and/or from the aggregator 228. For instance, the information or instructions from another 3-D printed packaging system and/or from aggregator 228 may instruct the computing device 102 to print packages that will fit within a remaining cargo area and/or weigh capacity of a vehicle (e.g., truck 230, drone 232, etc.) dispatched to pick up the package(s). Additionally or alternatively, the information or instructions from another 3-D printed packaging system and/or from aggregator 228 may instruct the computing device 102 to combine multiple items in a package, or split multiple items between separate packages, in order for the packages to fit better in the vehicle. Additionally or alternatively, the information or instructions from another 3-D printed packaging system and/or from aggregator 228 may instruct the computing device 102 to print specific hooks, loops, slots, adapters, connectors, couplers, or other features suitable for securing the package(s) in the vehicle, holding the package(s) during transit or delivery, manipulating the package(s) during transit or delivery, or the like.

In some examples, the packages making up the unit of packages may include one or more interlocking features configured to interlock with adjacent packages on the top, bottom, and/or sides to hold the unit of packages together. Examples of interlocking features include, without limitation, protrusions, grooves, puzzle pieces, channels, ridges, notches, or the like. In other examples, the packages themselves may be configured as puzzle pieces that lock together with one or more other packages. Additionally or alternatively, one or more straps, bands, wraps, supports, or other structures may be printed around at least a portion of the unit of packages to secure the unit of packages together and/or to the pallet or support surface.

By taking into account characteristics of other items to be packaged (by the computing device 102, other 3-D printed packaging systems of a same entity, and/or other 3-D printed packaging systems of other entities) and/or other items being shipped (e.g., other items to be shipped in a same truck, drone, or other vehicle), a computing device such as computing device 102, may ensure that not only is each item well packaged, but also that the packages will fit together with the other items to create a unit of packages that can easily be transported and/or stored together. Additionally, the packages may be added to a pallet or other transport structure in an order that protects more fragile and/or expensive items (e.g., fragile and/or expensive items may be placed at or near a top of a stack of packages). In one specific example, multiple items all destined for a same destination (e.g., city, transfer station, warehouse, etc.) may all be packaged concurrently or sequentially) and placed on a pallet or other support surface for transfer to the destination.

Alternatively, the packages making up the unit of packages may be independently packaged (i.e., not taking into account the other packages in the unit of packages and/or without knowledge of what unit of packages the package will be a part of). In that case, a computing device, such as computing device 102, may determine, for a plurality of packages, how to stack and arrange them on one or more pallets or other support surfaces to provide the most uniform, well packed unit(s) of packages possible. In some examples, the computing device may further print one or more spacers or empty packages to fill gaps or voids in the unit of packages to improve a stability and/or uniformity of the unit of packages. In some examples, the computing device may direct an item manipulator, such as item manipulator 108, to stack the packages as the computing device directs. However, in other examples, the item manipulator may be programmed to stack the packages independently of the computing device. In some instances, the item manipulator may use touch sensors on the item manipulator to determine the size and shape of the packages and to place them accordingly. In other examples, the item manipulator may use input from a scanner, such as scanner 106, or one or more other cameras or sensors to determine the size and shape of the packages and to place them accordingly.

In yet another example, multiple items may be packaged in multiple regions or compartments of a single package. Each region or compartment may include a single item or multiple items designed for a same destination. The package may include one or more separation features to allow separation of each of the multiple compartments or regions from the rest of the package. By way of example and not limitation, each of the regions or compartments may be coupled to the package by a skin or one or more thin strips of material, and one or more tear strips may be provided between the regions or compartments to separate the regions or compartments. Each region or compartment may be separated from the rest of the package by pulling on or otherwise breaking respective tear strips to separate the respective region or compartment into a separate package. In some examples, pulling a single tear strip may separate multiple regions or compartments (e.g., a whole row or column of packages) from the package. Examples of other separation features include perforations, notches, thinned or weakened sections, or the like.

Example Packaging Station

In one example, a 3-D printing system such as that shown in FIG. 1 may be implemented as a packaging station. In some examples, the packaging station may be an example of one or more of the entities 202 in FIG. 2. Such a station may be located in a bricks and mortar store, such as a retail store or shipping store (e.g., FedEx Kinkos, UPS Store, etc.), a governmental building (e.g., a post office), an airport, an indoor or outdoor kiosk, a storage facility, or at any other suitable location where items are to be packaged for shipping or storage. In this example, the system may include a user terminal including a display and one or more input devices (e.g., a microphone, touch screen, mouse, keyboard, etc.). The user may identify one or more items to be packaged by, for example, placing the item(s) in the printing area or another area proximate and/or associated with the 3-D printing system, selecting the items from a catalog or menu of items, notifying a clerk or operator of the items, or the like. In another example, the user may have previously identified the item(s) from a remote terminal (e.g., a personal computer, mobile device, or the like).

Additionally, in some examples, the user may be prompted or otherwise allowed to input additional information, such as a purpose of the packaging (e.g., storage, shipping, etc.), a sender address, a recipient address, a shipping mode and/or speed (e.g., UPS ground, FedEx overnight, etc.), any special handling instructions (e.g., fragile, hazardous materials, etc.), a cost of the item(s), an exterior decoration or "wrapping," and/or one or more package features (e.g., thermal insulation, vibration damping, hermetically sealed, child safe, tamper evident, etc.). In other examples, the packing station may automatically determine or infer any or all of these types of additional information. Additionally, in some examples, the 3-D printing system may display a price for packaging and/or shipping the item, and provide an interface by which the user can pay for the packaging, storage, and/or shipping.

Regardless of how the items are identified to the 3-D printing system, the item(s) may be packaged according to any of the techniques described herein. In some implementations, the packaged item(s) may be automatically placed into storage and/or shipped without any further input from the user. For instance, the packages may be placed in a post-printing staging area for pickup by a common carrier (e.g., USPS, UPS, FedEx, or the like), transported to a carrier for shipping, and/or loaded onto a vehicle (e.g., truck, airplane, ship, drone, etc.) for shipping. Alternatively, the packages may be placed in an output area for pickup and storage and/or shipping by the user. In various examples, the item(s) may be purchased prior to, as part of, or after the 3-D packaging process. In one specific example, the user may go to a store, select one or more items they want to purchase, provide the item(s) to the 3-D packaging system, and have the item packaged and/or shipped.

Ecommerce Merchant Example

In another example, a 3-D printing system including some or all of the components and/or techniques shown and described herein, with or without other components, may be implemented by an ecommerce merchant. Such a system may be located in a warehouse or fulfillment center of the ecommerce merchant and may utilize any or all of the structures, techniques, and systems described herein. When a user places an order for one or more items, the one or more items may be provided to the 3-D printing system. In some examples, the items may be retrieved by an employee, robot, conveyor, and/or other inventory management systems or tools of the ecommerce merchant and placed in the printing area or another proximate or associated area (e.g., a staging area, a bin of items to be packaged, or the like). In other examples, the items may be retrieved automatically by and/or under the control of one or more automated systems (e.g., robots, conveyors, machines, computer systems, etc.) and made available to the 3-D printing system. In some examples, the 3-D printing system may be communicatively coupled to the one or more automated systems.

In this example, once the user purchases one or more items from the ecommerce merchant, the item(s) may be automatically packaged and/or shipped according to any of the techniques described herein.

Example 3-D Printed Packaging for Medication

While the examples above are generally applicable to packaging of any items, the following example describes details suitable for packaging pharmaceutical compositions, medications, vitamins, supplements, and the like. This example may employ a 3-D printing system and/or techniques such as that shown and described herein. In this example, however, the system may be located in a sterile environment.

In some examples, one or more pills, capsules, gelcaps, or other medicinal product may be packaged in a 3-D printed package according to according to any of the techniques described herein. In such an example, the operation of preparing the printing area may comprise sterilizing the printing area. Further, the 3-D printed package in such an example may include one or more tamper evident features and/or child safety features, such as those described above. In some examples, the container may be formed and the medicinal product may be counted and placed in the container. In other examples, the medicinal product may be placed in the printing are and the container may be formed around the medicinal product. Such an arrangement may allow for a wide variety of new and previously unattainable packaging solutions. In some examples, the container may comprise a bottle, pouch, or other package into which individual pills, capsules, gelcaps, or other doses of the medicinal product are placed. In that case, the container may be made of a conventional plastic, metal, ceramic, or other material commonly used to house medicinal products.

In other examples, the 3-D printed container may comprise an ingestible capsule to hold a medicinal product in powder, liquid, solid, or gel form.

In still other examples, the medicinal product itself may be printed by the 3-D printing system. For instance, a print media of the 3-D printing system may comprise a pharmaceutical composition. In that case, the 3-D printer used in the system may be a food or pharmaceutical or food grade 3-D printer configured to print using pharmaceutical and/or food grade print media, such as compositions including, for example, one or more active ingredients with or without one or more fillers (e.g., lactose, cellulose, corn starch, sugars, whey, yeast, etc.) and/or one or more binders (e.g., povidone, xanthan gum, carbopol, glycerine, polylactic acid, etc.), or the like. Individual pills, capsules, gelcaps, or other doses (collectively referred to as "pills") of medicinal product may be formed (e.g., printed) in any desired shape and size, customized for a particular user's dose, and/or may be printed directly into a container. The container itself may additionally or alternatively have been printed using the same or different 3-D printing system. Formulation of print media may be varied during print process to adjust concentration of active and/or inactive ingredient in different pills and/or in different parts of a single pill (e.g., high concentration in exterior of pill for quick acting with lower concentration in interior of pill for long lasting). Print media may additionally or alternatively be varied to change the density and/or solubility of different portions of the pill (e.g., lower density and/or higher solubility of a first portion to promote quick release of active ingredient, with higher density and/or lower solubility of a second portion to promote delayed release). Additionally or alternatively, the formulation of the print media may be varied to use different active and/or inactive ingredients in different pills and/or different portions of a single pill (e.g., different active ingredients in different portions of the pill). Color of the print media may also be varied in accordance with variations in formulation in order to visually indicate the changes in formulation. These variances in print media may be designed as multiple (e.g., 2, 3, 4, . . . n) discrete portions, or the variances may be continuously variable (e.g., the concentration, density, and/or solubility of the print media may gradually increase from a minimum to a maximum).

The foregoing examples may be used to produce and/or package medication as-needed or on-demand. As such, the examples may find use in a staffed or self service pharmacy, hospital, doctor's office, grocery store, in a patient's home, or the like. Moreover, the examples may be applicable to bricks and mortar locations as well as online or mail order providers.

Example Methods

FIGS. 3-6 are flowcharts illustrating example methods that may, but need not necessarily, be used in connection with the systems of FIGS. 1 and 2. For ease of illustration and understanding, reference is made in the discussion of FIGS. 3-6 to the systems of FIGS. 1 and 2. However, the methods of FIGS. 3-6 are not limited to being performed using the systems of FIGS. 1 and 2. Moreover, the methods of FIGS. 3-6 may be used individually or in combination with one or more other methods. The methods of FIGS. 3-6 are illustrated as collections of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Moreover, in some embodiments, one or more blocks of the process may be omitted entirely.

Figure 3:
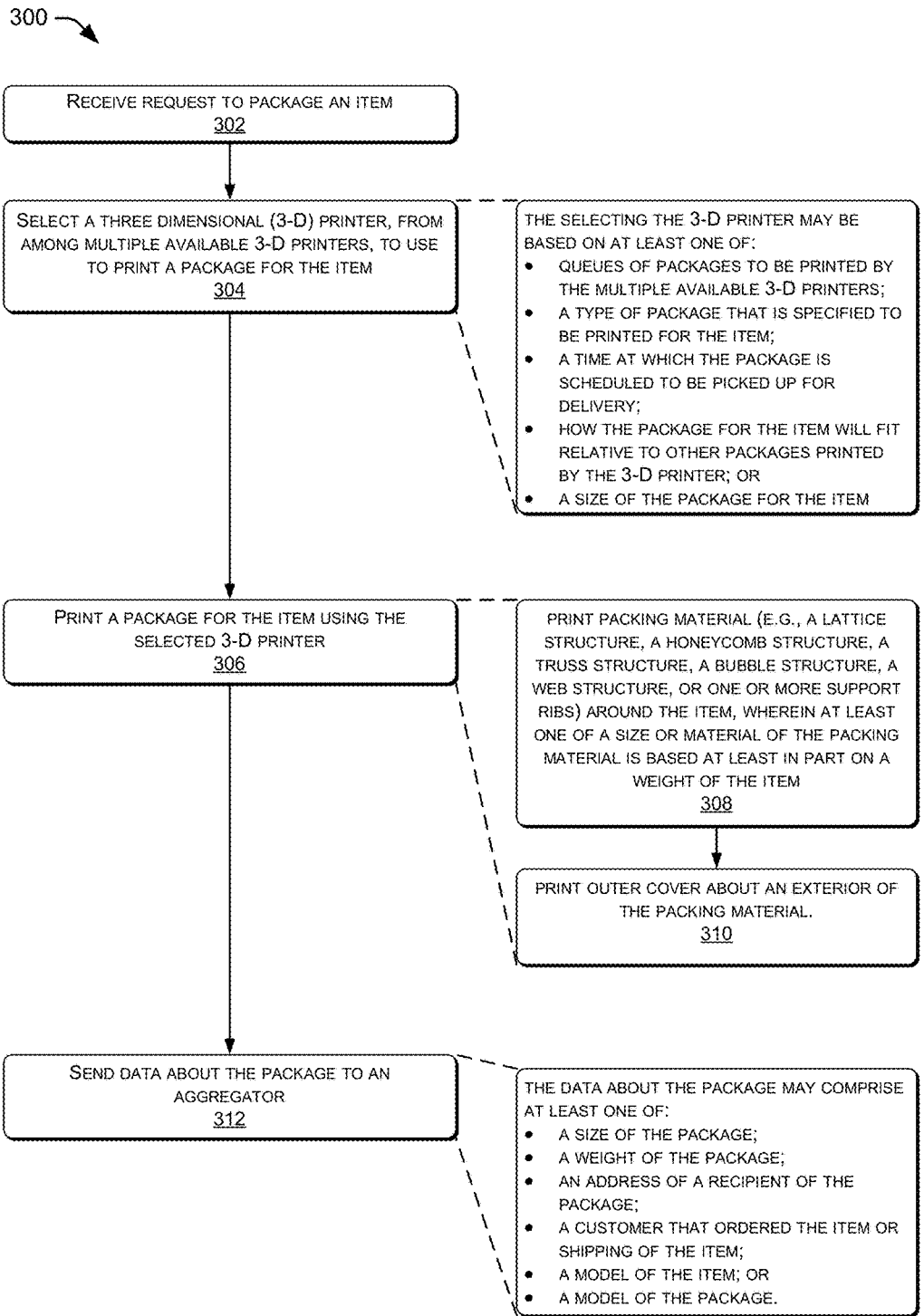
FIG. 3 is a flowchart illustrating an example method of packaging items using one or more 3-D printers from among multiple available 3-D printers.

FIG. 3 is a flowchart illustrating an example method 300 of packaging items using one or more 3-D printers from among multiple available 3-D printers.

The method 300 includes, at 302, receiving by a computing device of an entity, such as entity 202(N) of FIG. 2 for example, a request to package an item. At 304, a three dimensional (3-D) printer may be selected, from among multiple available 3-D printers, to use to print a package for the item. In some examples, the 3-D printer may be selected based on at least one of: queues of packages to be printed by the multiple available 3-D printers; a type of package that is specified to be printed for the item; a time at which the package is scheduled to be picked up for delivery; how the package for the item will fit relative to other packages printed by the 3-D printer; a size of the package for the item; and/or other criteria.

At 306, a package for the item may be printed using the selected 3-D printer. In some examples, printing the package may comprise, at 308 printing packing material around the item and, at 310, printing an outer cover about an exterior of the packing material. Printing the packing material may include, for example, printing at least one of a lattice structure, a honeycomb structure, a truss structure, a bubble structure, a web structure, or one or more support ribs. In some examples, a size and/or material of the packing material may be based at least in part on a weight of the item. Thus, stronger and/or more packing material may be used to package relatively heavier items. In some examples, the package printed may be suitable for shipping by common carrier (e.g., land, sea, or air vehicle). Unless otherwise specified, the term "vehicle" means any human driven, autonomous, or semi-autonomous land vehicle (e.g., car, truck, train, bus, van, etc.), water vehicle (e.g., boat, barge, etc.), aircraft (e.g., airplane, helicopter, drone/UAV, etc.), or spacecraft.

At 312, data about the package may be sent to an aggregator, such as aggregator 228 in FIG. 2. The data about the package may include, for example, a size of the package; a weight of the package; an address of a recipient of the package; a customer that ordered the item or shipping of the item; a model of the item; a model of the package; and/or other pertinent information about the package.

Figure 4:
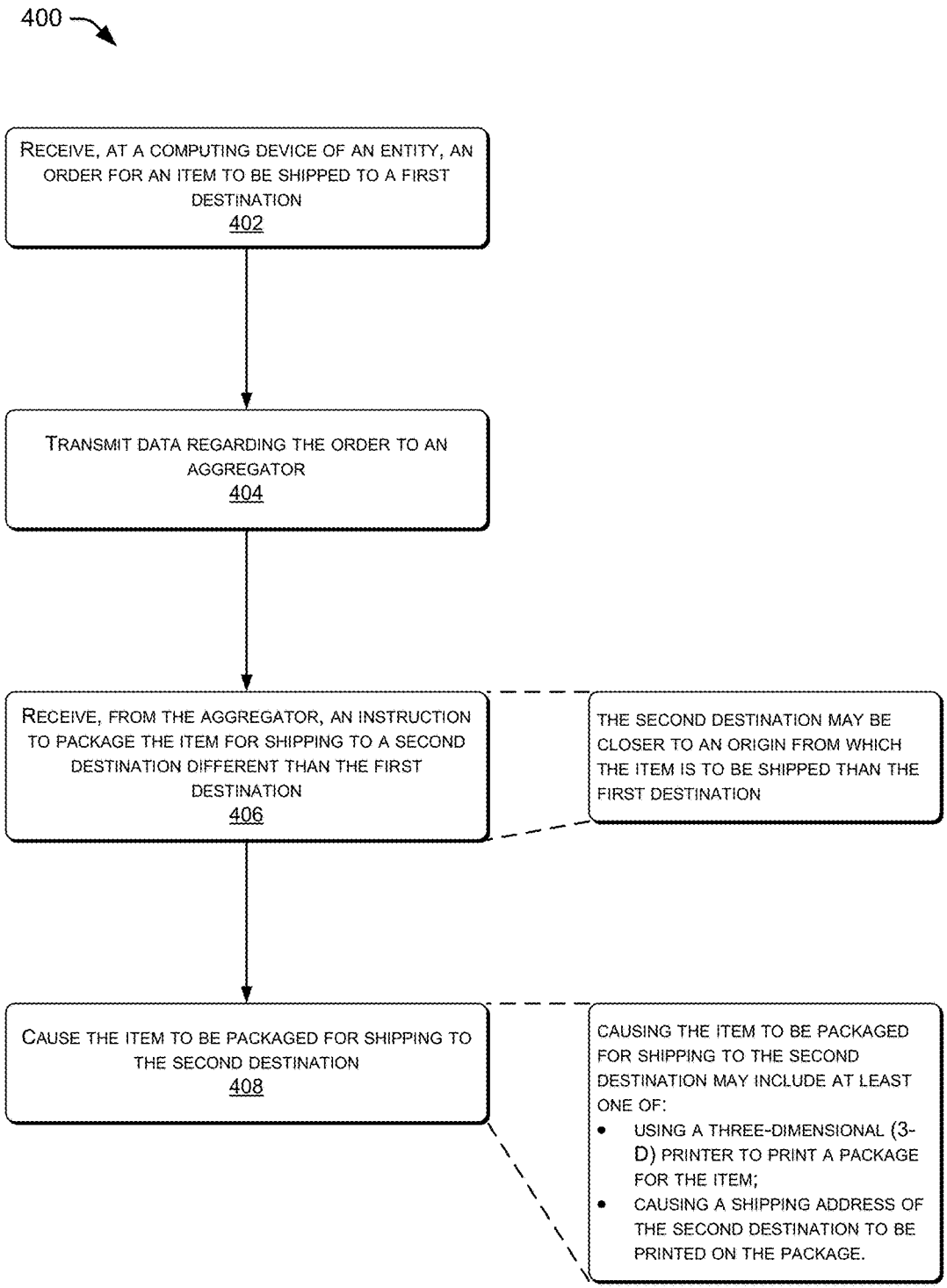
FIG. 4 is a flowchart illustrating an example method of improving a supply chain by leveraging data from an aggregator to cause items to be packaged and/or shipped from a preferred origin (e.g., an origin closest to the destination, a most cost-effective origin, etc.).

FIG. 4 is a flowchart illustrating an example method 400 of improving a supply chain by leveraging data from an aggregator to cause items to be packaged and/or shipped from a preferred origin (e.g., an origin closest to the destination, a most cost-effective origin, etc.). The method 400 includes, at 402, receiving, at a computing device of an entity, an order for an item to be shipped to a first destination. At 304, the computing device of the entity may transmit data regarding the order to an aggregator. The aggregator may receive data regarding multiple such orders and may determine that two different customers in two different geographical areas have ordered the same product from different entities. In that case, the aggregator may send an instruction to modify the order (e.g., to change a destination of the package) so that the orders are fulfilled more efficiently.

At 406, the computing device of the entity may receive, from the aggregator, an instruction to package the item for shipping to a second destination different than the first destination. In some examples, the second destination may be closer to an origin from which the item is to be shipped than the first destination At 408, the computing device may cause the item to be packaged for shipping to the second destination. The packaging may be performed by a 3-D printed packaging system, such as 3-D printed packaging system 204. In some examples, causing the item to be packaged for shipping to the second destination may comprise using a three-dimensional (3-D) printer to print a package for the item, and/or causing a shipping address of the second destination to be printed on the package in 2-D or 3-D.

Figure 5:
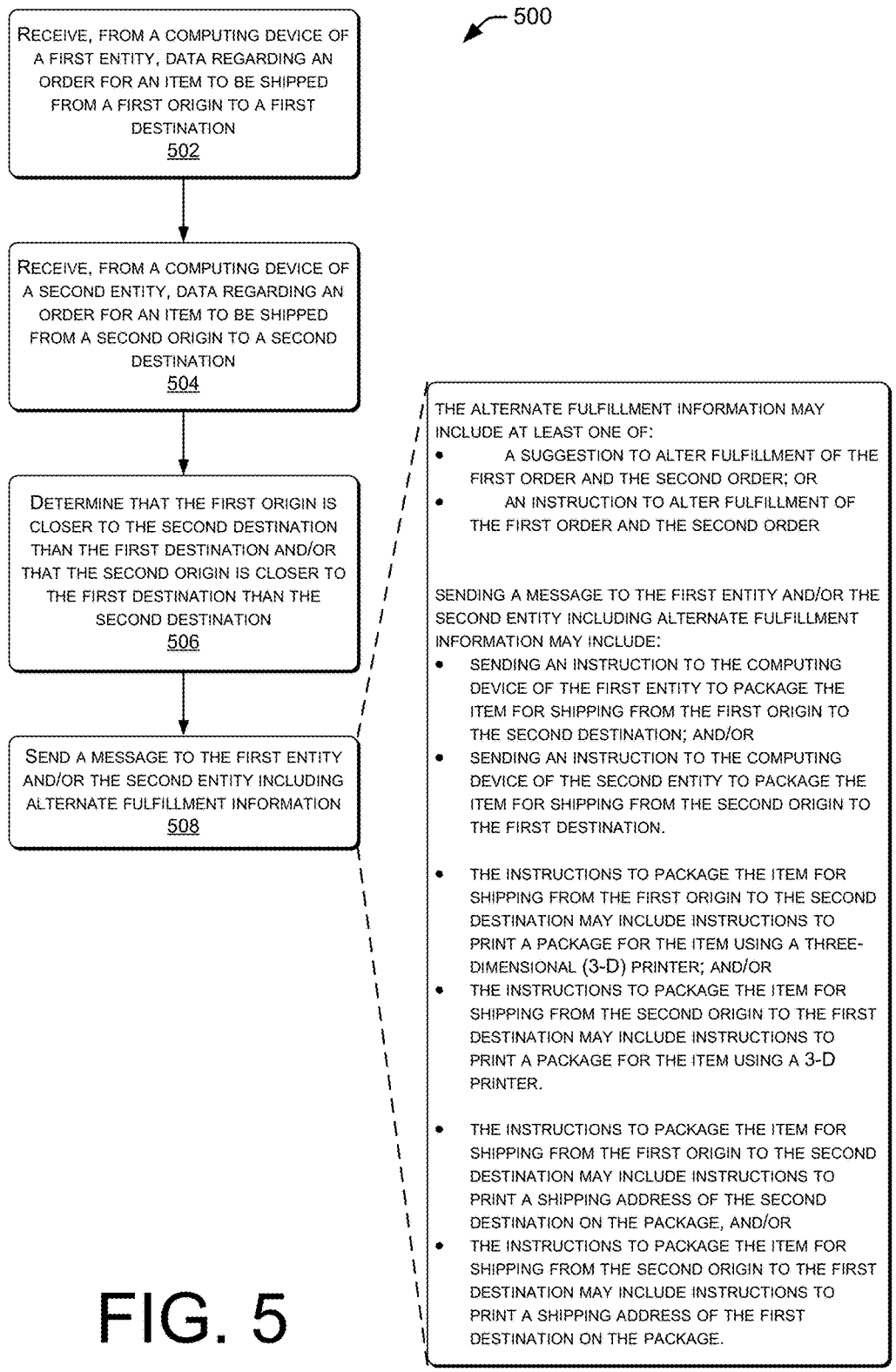
FIG. 5 is a flowchart illustrating an example method of improving a supply chain by sharing order data to cause items to be packaged and/or shipped from a preferred origin (e.g., an origin closest to the destination, a most cost effective origin, etc.).

FIG. 5 is a flowchart illustrating an example method 500 of improving a supply chain by sharing order data to cause items to be packaged and/or shipped from a preferred origin (e.g., an origin closest to the destination, a most cost-effective origin, etc.). The method 500 may, in some examples, be implemented by a computing device of an aggregator, such as aggregator 228. The method 500 includes, at 502, receiving, from a computing device of a first entity, data regarding an order for an item to be shipped from a first origin to a first destination and, at 504, receiving, from a computing device of a second entity, data regarding an order for an item to be shipped from a second origin to a second destination. At 506, a determination may be made that the first origin is closer to the second destination than the first destination and/or that the second origin is closer to the first destination than the second destination. In that case, at 508, a message may be sent to the first entity and/or the second entity including alternate fulfillment information. In some examples, the alternate fulfillment information may include a suggestion to alter fulfillment of the first order and the second order, or an instruction to alter fulfillment of the first order and the second order. In some examples, sending the message to the first entity and/or the second entity including alternate fulfillment information includes: sending an instruction to the computing device of the first entity to package the item for shipping from the first origin to the second destination; and sending an instruction to the computing device of the second entity to package the item for shipping from the second origin to the first destination. In some examples, the instructions to package the item for shipping from the first origin to the second destination include instructions to print a package for the item using a three-dimensional (3-D) printer; and the instructions to package the item for shipping from the second origin to the first destination include instructions to print a package for the item using a 3-D printer. In some examples, the instructions to package the item for shipping from the first origin to the second destination include instructions to print a shipping address of the second destination on the package, and the instructions to package the item for shipping from the second origin to the first destination include instructions to print a shipping address of the first destination on the package.

Figure 6:
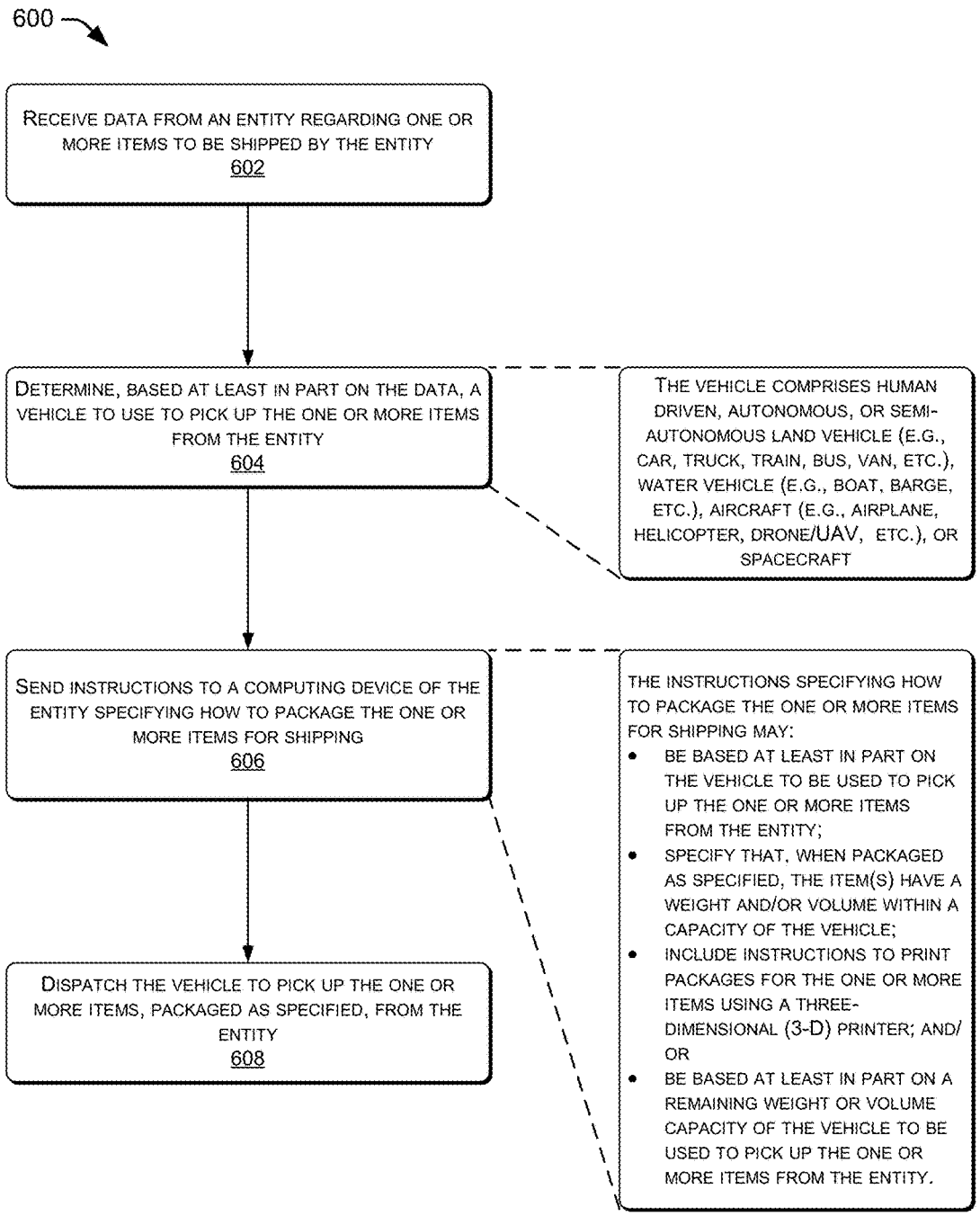
FIG. 6 is a flowchart illustrating an example method of improving a supply chain by coordinating packaging and/or dispatching of vehicles to transport/deliver the packages.

FIG. 6 is a flowchart illustrating an example method 600 of improving a supply chain by coordinating packaging and/or dispatching of vehicles to transport/deliver the packages. The method 600 may, in some examples, be implemented by a computing device of an aggregator, such as aggregator 228. The method 600 may include, at 602, receiving data from an entity regarding one or more items to be shipped by the entity. At 604, based at least in part on the data, a determination can be made as to a vehicle to use to pick up the one or more items from the entity. In some examples, the vehicle may comprise a human driven, autonomous, or semi-autonomous land vehicle (e.g., car, truck, train, bus, van, etc.), water vehicle (e.g., boat, barge, etc.), aircraft (e.g., airplane, helicopter, drone/UAV, etc.), or spacecraft.

At 606, instructions may be sent to a computing device of the entity specifying how to package the one or more items for shipping. In some examples, the instructions specifying how to package the one or more items for shipping may be based at least in part on the vehicle to be used to pick up the one or more items from the entity. In some examples, the instructions specifying how to package the one or more items for shipping may specify that, when packaged as specified, the item(s) have a weight and/or volume within a capacity of the vehicle. In some examples, the instructions specifying how to package the one or more items for shipping may include instructions to print packages for the one or more items using a three-dimensional (3-D) printer. In some examples, the instructions specifying how to package the one or more items for shipping may be based at least in part on a remaining weight or volume capacity of the vehicle to be used to pick up the one or more items from the entity.

At 608, the vehicle may be dispatched to pick up the one or more items, packaged as specified, from the entity.

CONCLUSION

Although the various examples have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method of packaging an item, the method comprising:

receiving, at a computing device of an entity, a request to package an item in a package;

sending data about the item to a computing device of an aggregator, the aggregator being separate from the entity;
receiving, from the computing device of the aggregator, instructions specifying how to package the item for shipping and instructions specifying a time at which the package is scheduled to be picked up for delivery;
selecting, based at least in part on the instructions specifying how to package the item for shipping and the instructions specifying the time at which the package is scheduled to be picked up for delivery, a three dimensional (3-D) printer, from among multiple available 3-D printers, to use to print the package for the item; and
printing the package for the item using the selected 3-D printer.

2. The method of claim 1, wherein the selecting the 3-D printer is further based on:
queues of packages to be printed by the multiple available 3-D printers; and
a type of package that is specified to be printed for the item.

3. The method of claim 1, further comprising sending, to the aggregator, data about the package, wherein the data about the package comprises at least one of:
a size of the package;
a weight of the package;
an address of a recipient of the package; or
a customer that ordered the item or shipping of the item.

4. The method of claim 1, further comprising sending, to the aggregator, data about the package, wherein the data about the package comprises at least one of:
a size of the package and a weight of the package; or
a model of the package.

5. The method of claim 1, wherein printing the package comprises:
printing packing material around the item; and
printing an outer cover about an exterior of the packing material.

6. The method of claim 5, wherein at least one of a size or material of the packing material is based at least in part on a weight of the item.

7. The method of claim 1, further comprising:
receiving, from the computing device of the aggregator, data regarding shipping the item; and
receiving, from the computing device of the aggregator, data regarding a vehicle to use to pick up the item.

8. The method of claim 7, wherein the instructions specifying how to package the item for shipping are based at least in part on a remaining cargo area and/or weight capacity of the vehicle to be used to pick up the item.

9. The method of claim 8, wherein the instructions specifying how to package the item for shipping specify that, when packaged as specified, the item has a weight and/or volume that is less than the remaining cargo area and/or weight capacity of the vehicle.

10. The method of claim 7, wherein the instructions specifying how to package the item for shipping include instructions to print the package for the item using the 3-D printer from among the multiple available 3-D printers.

11. The method of claim 7, wherein the instructions specifying how to package the item for shipping are based at least in part on a remaining weight or volume capacity of the vehicle to be used to pick up the item as packaged.

12. One or more computer-readable media storing instructions that, when executed by one or more processors, configure a system to perform operations comprising:
receiving, at a computing device of an entity, a request to package an item in a package;
sending data about the item to a computing device of an aggregator, the aggregator being separate from the entity;
receiving, from the computing device of the aggregator, instructions specifying how to package the item for shipping and instructions specifying a time at which the package is scheduled to be picked up for delivery;
selecting, based at least in part on the instructions specifying how to package the item for shipping and the instructions specifying the time at which the package is scheduled to be picked up for delivery, a three dimensional (3-D) printer, from among multiple available 3-D printers, to use to print the package for the item; and
printing the package for the item using the selected 3-D printer.

13. The one or more computer-readable media of claim 12, wherein the selecting the 3-D printer is further based on at least one of:
queues of packages to be printed by the multiple available 3-D printers; or
a type of package that is specified to be printed for the item.

14. The one or more computer-readable media of claim 12, the operations further comprising:
receiving data regarding shipping the item; and
receiving data regarding a vehicle to be used to pick up the item.

15. A system comprising:
one or more processors; and
memory storing instructions that, when executed by the one or more processors, configure the system to perform operations comprising:
receiving, at a computing device of an entity, a request to package an item in a package;
sending data about the item to a computing device of an aggregator, the aggregator being separate from the entity;
receiving, from the computing device of the aggregator, instructions specifying how to package the item for shipping and instructions specifying a time at which the package is scheduled to be picked up for delivery;
selecting, based at least in part on the instructions specifying how to package the item for shipping and the instructions specifying the time at which the package is scheduled to be picked up for delivery, a three dimensional (3-D) printer, from among multiple available 3-D printers, to use to print the package for the item; and
printing the package for the item using the selected 3-D printer.

16. The system of claim 15, the operations further comprising:
receiving data regarding shipping the item; and
determining, based at least in part on the data, a vehicle to be used to pick up the item.

17. The method of claim 1, further comprising:
sending, to the computing device of the aggregator, information about a location of the entity and a first destination for the item; and
receiving, from the computing device of the aggregator, instructions to ship the item to a second destination different than the first destination.

18. The one or more computer-readable media of claim 12, wherein the instructions specifying how to package the item for shipping:
  are based at least in part on a remaining cargo area and/or weight capacity of a vehicle to be used to pick up the item, and
  specify that, when packaged as specified, the item has a weight and/or volume that is less than the remaining cargo area and/or weight capacity of the vehicle.

19. The system of claim 15, wherein the instructions specifying how to package the item for shipping:
  are based at least in part on a remaining cargo area and/or weight capacity of a vehicle to be used to pick up the item, and
  specify that, when packaged as specified, the item has a weight and/or volume that is less than the remaining cargo area and/or weight capacity of the vehicle.

20. The method of claim 1, wherein:
  the aggregator is in communication with one or more other entities; and
  the instructions specifying how to package the item for shipping are further based at least in part on data received by the aggregator from the one or more other entities.

* * * * *